April 29, 1969   L. BAGNULO   3,441,293

PIPE COUPLING

Filed July 3, 1967

INVENTOR.
Luigi Bagnulo
BY Michael S Striker
Attorney 3,441,293
PIPE COUPLING
Luigi Bagnulo, Via A. Volta 18, Milan, Italy
Filed July 3, 1967, Ser. No. 650,689
Claims priority, application Italy, July 6, 1966,
15,646/66
Int. Cl. F16l 23/00, 55/00
U.S. Cl. 285—50                                    7 Claims

ABSTRACT OF THE DISCLOSURE

An electrically insulated pipe coupling. An electrically conductive first tubular member is provided with an open-ended axial recess bounded by a peripheral wall including an annular wall portion extending radially inwardly axially spaced from the open end of the recess. An electrically conductive second tubular member has an end portion including an outer peripheral surface and a radially outwardly extending flange. The end portion is received in the recess and defines therewith a continuous gap extending from the central aperture of the annular wall portion to the open end of the recess. Filler means consisting entirely of electrically non-conductive material is received in and sealingly fills the gap. The filler means includes a rigid annular first portion surrounding the end portion intermediate the flange and the open end and comprising surface portions which cooperate with the wall and the flange for preventing movement of the latter toward the open end. The filler means further comprises a second portion filling the remainder of the gap. A liner of electrically insulating material lines the inner surfaces of adjoining portions of the passages in the tubular members.

Cross-references to related applications

A related application by Luigi Bagnulo, entitled "Insulating Connection Means for Piping" was filed on Apr. 13, 1964, under Ser. No. 359,539; it is now abandoned.

Background of the invention

The present invention relates generally to a pipe coupling arrangement, and more particularly to an electrically insulated pipe coupling.

It is known to prevent the passage of electrical current from one length of current-conducting pipe to another adjoining length. Arrangements of this type are used in a wide variety of applications for conducting pressurized and also non-pressurized fluids. Thus, such arrangements are utilized in piping of water feeding systems, in gas pipelines, in oil pipelines, and in similar applications where it is necessary to protect the piping against damage and the other well-known drawbacks which can result from the undesired passage of current along the conductor constituted by the interconnected length of piping. The electrical insulation between adjoining pipe sections of current-conductive material is achieved at the joint which connects such pipe sections together. Thus, such joints must provide electrical insulation between adjoining pipe sections. Evidently, however, the joint must also be fluid-tight, a condition which applies regardless of whether the fluid being conducted in the pipe system is pressurized or not. Inasmuch as joints of this type, particularly joints which are employed in pipe systems buried underground, frequently undergo severe mechanical stresses, whose nature may be flexural, tensile and/or torsional, it is essential that these joints be capable of withstanding all such stresses without either developing leaks or suffering from a disruption of their insulating properties which could establish electrical continuity between the adjoining pipe sections.

Joints are known from the prior art which fulfill these conditions. However, the construction and assembly of these joints require considerable care and skill. Parts must be machined to fine tolerances, assembly must be effected by highly skilled specialists, and other conditions obtain which make the manufacture and use of these prior-art joints both difficult and very expensive. While there are certain applications in which this consideration does not play a dominant role, it has long been recognized in the industry that there are many other applications where the technical skill involved in the manufacture and assembly of these joints, and the concomitant high expense of such joints, make their use prohibitively uneconomical. There has therefore existed, prior to the present invention, an unresolved need in this field for a pipe coupling of the general type outlined above, and capable of fulfilling the aforementioned requirements, but simpler to manufacture and to assemble, and accordingly also more economical.

Summary of the invention

The present invention provides an electrically insulated pipe coupling having the aforementioned advantageous properties.

More particularly, the present invention provides an electrically insulated pipe coupling which is composed of relatively few components all of which are technically uncomplicated and require little or no precision in their construction.

The pipe coupling in accordance with the present invention has a high mechanical rigidity, and high resistance to tensile, flexural and torsional stresses.

In accordance with one feature of my invention I provide an electrically insulated pipe coupling which comprises an electrically conductive first tubular member and an electrically conductive second tubular member. The first tubular member is provided with an open-ended axial recess which is bounded by a peripheral wall and which latter includes an annular wall portion extending radially inwardly axially spaced from the open end and defining a central aperture which communicates with an axial passage of the tubular member. The second tubular member also has an axial passage and it has an end portion which includes an outer peripheral surface and a radially outwardly extending flange. This end portion of the second tubular member is received in the open-ended recess of the first tubular member so that the aperture of the recess is aligned with the axial passage of the second tubular member in which condition the outer peripheral surface and the peripheral wall together define a continuous gap which extends from the central aperture to the open end of the recess.

In accordance with the invention I provide filler means which consists entirely of electrically non-conductive material and which is received in the gap and sealingly fills the same. This filler means includes a rigid annular first portion which surrounds the end portion of the second tubular member intermediate the flange thereof and the open end of the recess. The annular first portion comprises surface portions which cooperate with the wall and with the flange for preventing movement of the flange in the direction toward the open end. The filler means further comprises a second portion which fills the remainder of the gap and which completes the sealing action and immobilizes the end portion of the second tubular member in the recess of the first tubular member.

Finally, I further provide a liner of electrically insulating material which lines the inner surfaces of adjoining portions of the respective axial passages of the two tubular members.

In assembling this novel joint according to the present invention I first dispose an annular gasket, which constitutes a part of the second portion of the filler means, in the recess of the first tubular member so that it surrounds the central aperture thereof and overlies the annular wall portion. Thereupon, I introduce the end portion of the second tubular member until the flange thereof engages the annular gasket. Now I fill the recess in the first tubular member to a level substantially halfway between the annular wall portion and the open end of the recess with a flowable resin having high viscosity and being capable of hardening by polymerization. It should be pointed out here that if desired I can initially wet the sealing gasket with this same resin before introducing it into the axial recess. Once the recess is filled as just outlined, I insert an annular member in form of a ring or sleeve consisting of an electrically insulating material having a high compression resistance. Such a material may be bakelite, a fiberglass material impregnated with a polymerizable resin, or a similar material, and this sleeve, as it will hereafter be called, substantially fills the space between the flange of the second tubular member and the peripheral wall of the first tubular member, or rather the peripheral wall which bounds the recess of the first tubular member. In accordance with the invention I prefer that this sleeve, which constitutes the rigid annular first portion mentioned earlier, be of substantially frusto-conical configuration in that its outer peripheral face diverges somewhat in the direction from the open end of the recess towards the flange. Because the sleeve consists of a substantially incompressible material, but is to be deflected into tight engagement with the outer peripheral surface of the end portion of the second tubular member, it will advantageously consist of two or more segments or with at least one slotted incision extending from the outer peripheral face to the central opening of the sleeve.

It will be evident that, as this sleeve is introduced, the resin in the recess will be partially displaced and will ooze upwardly along the inner face of the peripheral wall bounding the recess and/or along the outer peripheral surface of the end portion of the second tubular member. The excess resin which thus escapes to the vicinity of the open end of the recess will form, just at the outer free end face of the sleeve, a collar or bead which, upon hardening of the resin, becomes rigid and strongly adheres to the peripheral wall and to the sleeve.

Of course, it is essential that the gasket be subjected to axial compression to properly perform its sealing function between the first and second tubular members. Therefore, the second tubular member or the sleeve is subjected to axial pressure in the direction from the open end of the recess towards the annular wall portion thereof, thereby causing axial compression of the annular gasket. In accordance with the invention the peripheral wall surrounding the recess of the first tubular member is subjected to radial compression while such axial compression is maintained, and the instrumentalities for the axial compression as well as for the radial compression are well-known and need not be described. It might merely be mentioned that for instance the radial compression can be effected by suitable instrumentalities exerting radial inwardly directed pressure, by application of a mold on the outside of the peripheral wall, or in a like manner. The radial compression effects inward deformation of the peripheral wall into conformity with the taper of the sleeve and, inasmuch as the cross-section of the sleeve nearer to the open end of the recess is smaller than farther spaced from the open end of the recess, the sleeve will be tightly retained by the peripheral wall which now defines a recess whose cross-section corresponds to that of the sleeve. Moreover, the inwardly directed radial pressure effects strong deflection of the sleeve or the individual sections thereof into engagement with the outer peripheral surface of the end portion of the second tubular member and this contact of the sleeve, as well as its contact with the inner surface of the peripheral wall of the first tubular member, provide strong frictional engagement and, in conjunction with the configuration of the peripheral wall, and with the locking effect of the hardened resin, prevents any axial movement of the two tubular mmebers with respect to one another. It is to be noted that the axial pressure on the gasket can conceivably be effected merely by the inward deformation of the peripheral wall because, owing to the taper of the outer face of the sleeve, this pressure has an axially directed component of force.

To facilitate engagement between the facing surfaces of the sleeve and the peripheral wall on the one hand, and the sleeve and the end portion of the second tubular member on the other hand, any or all of these facing surfaces may be roughened, for instance by sandblasting or the like, provided with alternating depressions and projections, knurled, or treated in a similar manner. It is also possible and, in fact, preferred, although it is not mandatory, to upset the edge portion of the peripheral wall which surrounds the open end of the recess, that is to deflect it radially inwardly to a greater degree than the remainder of the wall, and this facilitates adhesion of the resinous bead which forms in the region of the open end. Upon completing the assembly as described before, a lining of electrically insulating material, for instance of a suitable synthetic resin material, is applied to the inner surfaces of adjoining portions of the passages in the first and second tubular members. This can be done in a variety of ways, for instance by brushing the resin on, by flowing it on, or in a similar manner well-known in this art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

*Description of the preferred embodiment*

Figure 1:
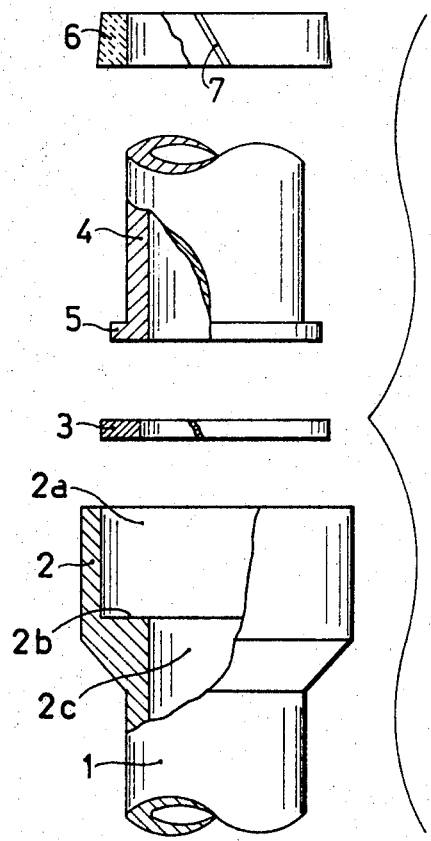
FIG. 1 is an exploded view, showing the constituent components of my novel coupling, in partially sectional elevation.

Discussing firstly FIG. 1, it will be seen that I illustrate there a first tubular member, generally designated with reference numeral 1, which is provided with a flared bell or socket 2 provided with an axially extending recess 2a. Spaced from the open end of this recess 2a the peripheral wall thereof is provided with a radially inwardly extending annular wall portion 2b which communicates with the central passage 2c of the tubular member 1.

A second tubular member 4 is provided whose end portion comprises a radially extending flange 5 of such dimension as to be receivable in the recess 2a. I further provide an annular gasket 3 of an electrically insulating material, and a sleeve 6, also consisting of an electrically insuating material which, however, contrary to the material of the gasket 3 is substantially incompressible and may consist of one of the materials outlined earlier. The sleeve 6 has an outer face which diverges, as shown in FIG. 1, and the sleeve is provided with either one slot 7, or with two or more such slots which then divide the sleeve into two or more segments.

Figure 2:
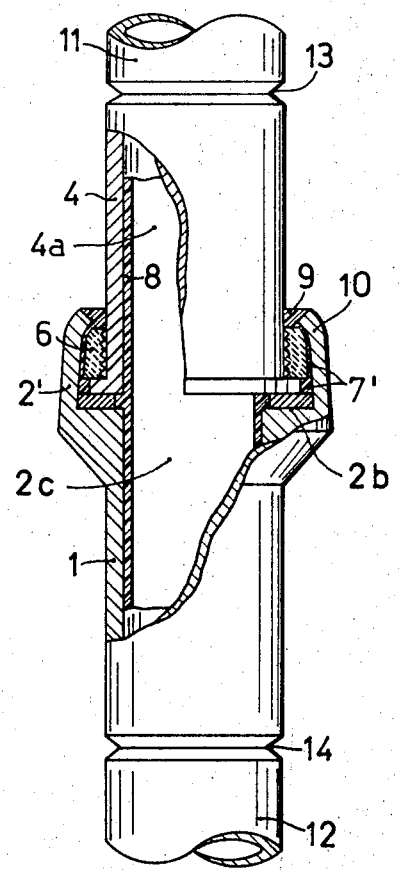
FIG. 2 is a partly sectioned elevation of an assembled coupling in accordance with the present invention.

FIG. 2 shows the novel joint in accordance with the present invention in assembled condition. The reference numerals in FIG. 2 correspond to those of FIG. 1 insofar as identical components and/or configurations are involved. Reference numeral 1 again identifies the first tubular member 1 and reference numeral 4 again identifies the second tubular member 4. It is clearly evident that the annular gasket 3 has been placed into the open-ended recess 2a of the member 1 so that it overlies the radial wall portion 2b at the inner end of the recess 2a, surrounding the central passage 2c of the member 1. The flange 5 of the second tubular member 4 overlies and abuts the annular gasket 3 which latter is suitably compressed in axial direction, as discussed before. The sleeve 6 extends intermediate the flange 4 and the open end of the recess 2a surrounding the end portion of the second tubular member 4 and it is clear that it substantially fills the space between the flange and the open end of the recess, as well as the space between the inner surface of the wall 2 and the outer surface of the end portion of tubular member 4.

Upon introduction of the annular gasket 3 and of the end portion of tubular member 4 into the recess 2a, but prior to introduction of the sleeve 6, a high-viscosity resin of the type which hardens by polymerization has been introduced into the space and is indicated with reference numeral 7'. It is clear that it fills the space between the flange 5 and the inner surface of the wall 2. Unlike what is visible in the finished construction of FIG. 2, however, the quantity of resin 7' thus introduced originally extends to a level above the upper surface of the flange 5, and in actuality to a level substantially midway between the annular wall portion 2b and the open end of the recess 2a. However, upon introduction of the sleeve 6 the excess quantity of this resin oozes along the facing surfaces of the sleeve and the wall 2 on the one hand, and/or the sleeve and the end portion of tubular member 4 on the other hand. Such of the resin as escapes between these facing surfaces to the vicinity of the open end of the recess 2a forms there an annular bead 9.

Upon introduction of the sleeve 6 the wall 2 is radially inwardly compressed to assume the configuration indicated with reference numeral 2' in FIG. 2 where it will be seen to conform to the taper of the outer face of sleeve 6. While this compression is effected the gasket 3 is of course maintained under axial compression, for instance by exerting an axial force on the tubular member 4 with a suitable instrumentality, or by exerting such an axial force on the sleeve 6. The latter can be simply accomplished by introducing a suitable instrumentality into the open end of the recess 2a intermediate the wall 2' and the end portion of the tubular member 4. As already pointed out earlier, however, it is also conceivable to effect such axial compression of the gasket 3 as a result of the axially directed component of force accompanying the radial compression of the wall 2 into the configuration 2' in which it engages and radially compresses the sleeve 6 against the outer surface of the tubular member 4.

Advantageously, but not necessarily, the edge portion of the wall 2 which borders the open end of the recess 2a, and which is identified with reference numeral 10, will be deflected radially inwardly to a greater degree than the remainder of the wall 2, thus constituting an additional safeguard against movement of the sleeve 6 outwardly of the opening 2a and also providing a better anchorage for the bead 9 of resinous material.

The lining 8 of resin material, which may or may not be identical with the resin material 7' of FIG. 2, is subsequently applied on the inner surfaces of adjoining portions of the axial passages 2c and 4a of the tubular members 1 and 4, respectively, so as to prevent the formation of electric arcs between these two tubular members which, as is clearly evident from the drawing and from what has been said before, consist of electrically conductive, usually metallic material.

As shown in FIG. 2 the assembled joint or coupling is connected to the ends of pipes 11 and 12, for instance by being welded thereto at 13 and 14, or in another manner such as via screw-threading or the like.

In the novel coupling according to the present invention the entire filler which connects the tubular members 1 and 4 to one another consists of electrically non-conducting material. Only very few components are required for the novel coupling and their interconnection is such that any axial movement of the tubular members 1 and 4 with reference to one another is reliably prevented. Evidently, the resin material, just as the material of the sleeve 6, has a high resistance to mechanical stresses as well as a high dielectric strength and thus provide all the desired advantages outlined earlier in this specification.

The novel coupling according to the present invention may be entirely manufactured at the factory, and then may be shipped into the field for connection to the piping, such as the pipes 11 and 12 shown in FIG. 2. However, it may also be assembled in the field and requires no specialized knowledge or skills for such assembly. Once the novel coupling is assembled, all stresses are transmitted from one of the tubular members 1, 4 to the other through the filler means consisting of the sleeve 6 and the resin material 7' and no stressing of the gasket 3 takes place. This is the result of the fact that the coupling is rigid and constitutes a monolithic assembly. In fact, an additional advantage of the monolithicity and rigidity of the novel coupling is the fact that cracking of the lining 8 under variable stresses is avoided, whereby the dielectric insulation is maintained intact at all times.

It will be understood that each of the elements described above, or two or more together, may also find a useful application in other types of couplings differing from the types described above.

What is claimed as new and desired to be protected by Letters Patent is set forth in the appended claims:

1. An electrically insulated pipe coupling, comprising, in combination, an electrically conductive first tubular member provided with an open-ended axial recess surrounded by a peripheral wall, including an annular wall portion extending radially inwardly axially spaced from said open end and defining a central aperture communicating with a first axial passage and a circumferential edge portion bounding the open end of said recess and being inclined radially inwardly; an electrically conductive second tubular member having a second axial passage and an end portion including an outer peripheral surface and a radially outwardly extending flange, said end portion being received in said recess in alignment of said aperture with said second passage and said outer peripheral surface defining with said peripheral wall a continuous gap extending from said central aperture to said open end of said recess; filler means consisting entirely of electrically non-conductive material received in and sealingly filling said gap, said filler means including a rigid annular first portion in form of an annular insert having at least one radial slot for enhancing radial compressibility of said insert and surrounding said end portion intermediate said flange and said open end, said first portion and said wall and flange comprising respective surface portions cooperating with one another for preventing movement of the latter toward said open end, an annular gasket of elastically compressible material sandwiched between said flange and said annular wall portion, and a second portion in form of a body of hardened synthetic resin material filling the remainder of said gap in engagement with the respective surface portions for preventing movement of said flange; and a liner of electrically insulating material lining the inner surfaces of adjoining portions of said first and second passages of said tubular members.

2. A pipe coupling as defined in claim 1, wherein said annular first portion increases in cross-sectional area in direction from said open end toward said flange, and wherein said axial recess has a cross-sectional configuration complementary to that of said annular first portion and said peripheral wall comprises an edge portion surrounding said open end and projecting radially inwardly thereacross.

3. A pipe coupling as defined in claim 1, wherein said peripheral wall comprises an inner peripheral surface facing toward an outer surface of said annular first portion, and at least one of said surfaces being provided with projections and depressions whereby to enhance frictional engagement with said annular first portion.

4. A pipe coupling as defined in claim 1, wherein said synthetic resin material is a polymerizable resin material.

5. A pipe coupling as defined in claim 1, wherein said annular first portion consists of a material having high compression resistance.

6. A pipe coupling as defined in claim 5, wherein said material of said annular first portion is bakelite.

7. A pipe coupling as defined in claim 5, wherein said annular insert is fiberglass impregnated with a polymerizable resin.

References Cited

UNITED STATES PATENTS

| | | | |
|---|---|---|---|
| 997,087 | 7/1911 | Peeples | 285—54 X |
| 1,284,145 | 11/1918 | Rudolph | 285—295 |
| 2,195,559 | 4/1940 | Briegel | 285—382 X |
| 2,316,690 | 4/1943 | Healy | 285—382 X |
| 2,661,500 | 12/1953 | Seymour et al. | 285—295 X |
| 2,998,269 | 8/1961 | Houghton | 285—296 X |

FOREIGN PATENTS

| | | |
|---|---|---|
| 745,513 | 11/1966 | Canada. |
| 870,952 | 6/1961 | Great Britain. |
| 6,400,224 | 1/1965 | Netherlands. |
| 360,554 | 4/1962 | Swiss. |

CARL W. TOMLIN, *Primary Examiner.*

D. W. AROLA, *Assistant Examiner.*

U.S. Cl. X.R.

285—55, 296, 382